United States Patent

Weinstein

[15] 3,700,982

[45] Oct. 24, 1972

[54] CONTROLLED RECTIFIER HAVING GATE ELECTRODE WHICH EXTENDS ACROSS THE GATE AND CATHODE LAYERS

[72] Inventor: Harold Weinstein, Van Nuys, Calif.

[73] Assignee: International Rectifier Corporation, Los Angeles, Calif.

[22] Filed: Aug. 12, 1968

[21] Appl. No.: 751,804

[52] U.S. Cl.......317/235 R, 317/234 N, 317/235 AB, 317/235 AE, 317/235 AJ

[51] Int. Cl...............................................H01l 11/10

[58] Field of Search.......................................317/234

[56] References Cited

UNITED STATES PATENTS

| | | | |
|---|---|---|---|
| 3,408,545 | 10/1968 | DeCecco et al. | 317/235 AB |
| 3,428,874 | 2/1969 | Gerlach | 317/235 AB |
| 3,440,501 | 4/1969 | Piccone et al. | 317/235 AB |
| 3,486,088 | 12/1969 | Gray et al. | 317/235 AB |
| 3,566,210 | 2/1971 | DeCecco | 317/235 AB |
| 3,549,961 | 12/1970 | Gault | 317/235 AB |
| 3,278,347 | 10/1966 | Topas | 148/33.2 |
| 3,335,296 | 8/1967 | Smart | 307/88.5 |
| 3,386,016 | 5/1968 | Lindmayer | 317/235 |
| 3,268,782 | 8/1966 | Weinstein | 317/235 |
| 3,317,746 | 5/1967 | Hutson | 307/88.5 |
| 3,328,652 | 6/1967 | Sylvan | 317/235 |
| 3,366,851 | 1/1968 | Herlet et al. | 317/235 |
| 3,435,515 | 4/1969 | Kurpisz et al. | 29/580 |

FOREIGN PATENTS OR APPLICATIONS

| | | | |
|---|---|---|---|
| 901,239 | 7/1962 | Great Britain | 317/235 |

OTHER PUBLICATIONS

W. Gerlach, " Thyristor mit Querfeld–Emitter" , Z. fur angewandte Phys. vol. 5, No. 19 (1965), pp. 396–400.

Somos et al, Proc. IEEE, Vol. 55, no. 8, August 1967, " Behavior of Thyristors Under Transient Conditions" , pp. 1306– 1311.

*Primary Examiner*—John W. Huckert
*Assistant Examiner*—William D. Larkins
*Attorney*—Ostrolenk, Faber, Gerb and Soffen

[57] ABSTRACT

To permit high rate-of-rise-of-current in a controlled rectifier, the gate electrode extends from the emitter region across the uppermost junction and into contact with the opposite conductivity region under the cathode electrode. When a positive pulse is applied to the gate, the cathode region adjacent the gate is less negatively charged than it would otherwise be if placed conventionally on the P region only. This will reduce current concentration at the emitter edge adjacent to the gate region so that a greater rate-of-rise-of-current is permissible. A groove is interposed between the gate and cathode electrode providing a means of adjusting the impedance between both. This permits limiting of excessive gate-cathode currents through the joining N emitter layer.

7 Claims, 10 Drawing Figures

PATENTED OCT 24 1972

3,700,982

INVENTOR.
HAROLD WEINSTEIN

BY

Ostrolenk, Faber, Gerb & Soffen

ATTORNEYS

CONTROLLED RECTIFIER HAVING GATE ELECTRODE WHICH EXTENDS ACROSS THE GATE AND CATHODE LAYERS

This invention relates to controlled rectifier devices, and more particularly relates to a controlled rectifier construction in which the rate-of-rise-of-current upon firing the device is increased by causing the gate electrode to extend between the emitter layer and cathode layer of the device and across the first junction of the device. If the proper impedance characteristics of the gate electrode are to be retained with respect to the cathode electrode, a groove is interposed between the gate electrode and the cathode electrode in the layer below the cathode electrode.

It is well known that when a controlled rectifier is fired, the initial conduction plasma will be located at the emitter edge adjacent the gate electrode since the majority of conductivity carriers will be concentrated in this region and beneath this region of the cathode electrode. Therefore, it is necessary to intentionally reduce the injection-current density of the cathode emitter and to spread this initial injected current over a larger area within the same given time.

In accordance with the present invention, the gate electrode, which is made positive in order to turn the device on in one of the sequences of the four-layer construction of the controlled rectifier, is caused to extend across the first junction of the device so that the gate electrode is connected to both the P base layer and the cathode layer beneath the cathode of the device. The application of a positive signal for firing the device will then decrease the negative charge in the cathode layer adjacent the gate so that initial conduction plasmas will not be as heavily concentrated in the regions adjacent the gate as in the prior art, but will tend to be distributed over a greater area beneath the heavy cathode electrode. Therefore, the rate of increase of current can be increased with this arrangement since heat can be better disposed of from regions beneath the relatively heavy cathode electrode, and since these initial conduction regions will be more evenly distributed over the full conduction areas of the device.

Clearly, this arrangement can be used in combination with the shorted emitter arrangement where the cathode electrode overlaps on to the emitter layer at regions spaced from the overlapping area of the gate electrode in order to retain the desirable characteristics of tending to prevent firing due to high rates-of-rise-of-forward-voltage in the absence of a gate signal.

When the gate electrode extends across both the emitter and cathode regions, it will be understood that the rectifying junction normally presented between the gate and cathode of a standard controlled rectifier will be short-circuited. In accordance with a further feature of the invention, a groove is interposed between the gate and cathode electrodes to provide a high impedance path between the two to limit excessive gate current.

Accordingly, a primary object of this invention is to provide a novel controlled rectifier having an increased permissible rate-of-rise-of-current upon firing.

A further object of this invention is to provide a configuration for controlled rectifiers which permits a high rate-of-rise-of-current upon firing and which withstands high rate-of-rise-of-forward-voltage without firing, in the absence of a gate signal.

A further object of this invention is to improve the rate-of-rise-of-current upon firing in a controlled rectifier while retaining a high impedance between the gate and cathode electrodes of a controlled rectifier device.

These and other objects of this invention will become apparent from the following description when taken in connection with the drawings in which:

FIG. 1 is a cross-sectional view of a prior-art type of controlled rectifier using a ring gate.

FIG. 1a is a top view of a controlled rectifier constructed in accordance with the present invention having a shorting ring gate.

FIG. 2 is a cross-sectional view of FIG. 1a taken across the section line 2 — 2 in FIG. 1a.

FIG. 3 is a cross-sectional view similar to FIG. 2, illustrating the further provision of a groove in the cathode layer for retaining the rectifying characteristic between the emitter and cathode layers.

FIG. 4 is a top view similar to FIG. 1a of a second embodiment of the invention using a single gate lead connection to the emitter layer.

FIG. 5 is a cross-sectional view of FIG. 4 taken across the section line 5 — 5 in FIG. 4.

FIG. 6 is a top plan view of a further embodiment of the invention similar to FIG. 4 where two gate electrodes are provided.

FIG. 7 is a top plan view of a still further embodiment of the invention using a center gate configuration.

FIG. 8 is a cross-sectional view of FIG. 7 taken across the section line 8 — 8 in FIG. 7.

FIG. 9 is similar to FIG. 8 and shows the provision of the groove for retaining the gate rectifying characteristics.

Figures 1, 1A, 2, 3, 4, 5, 6, 7, 8, 9:
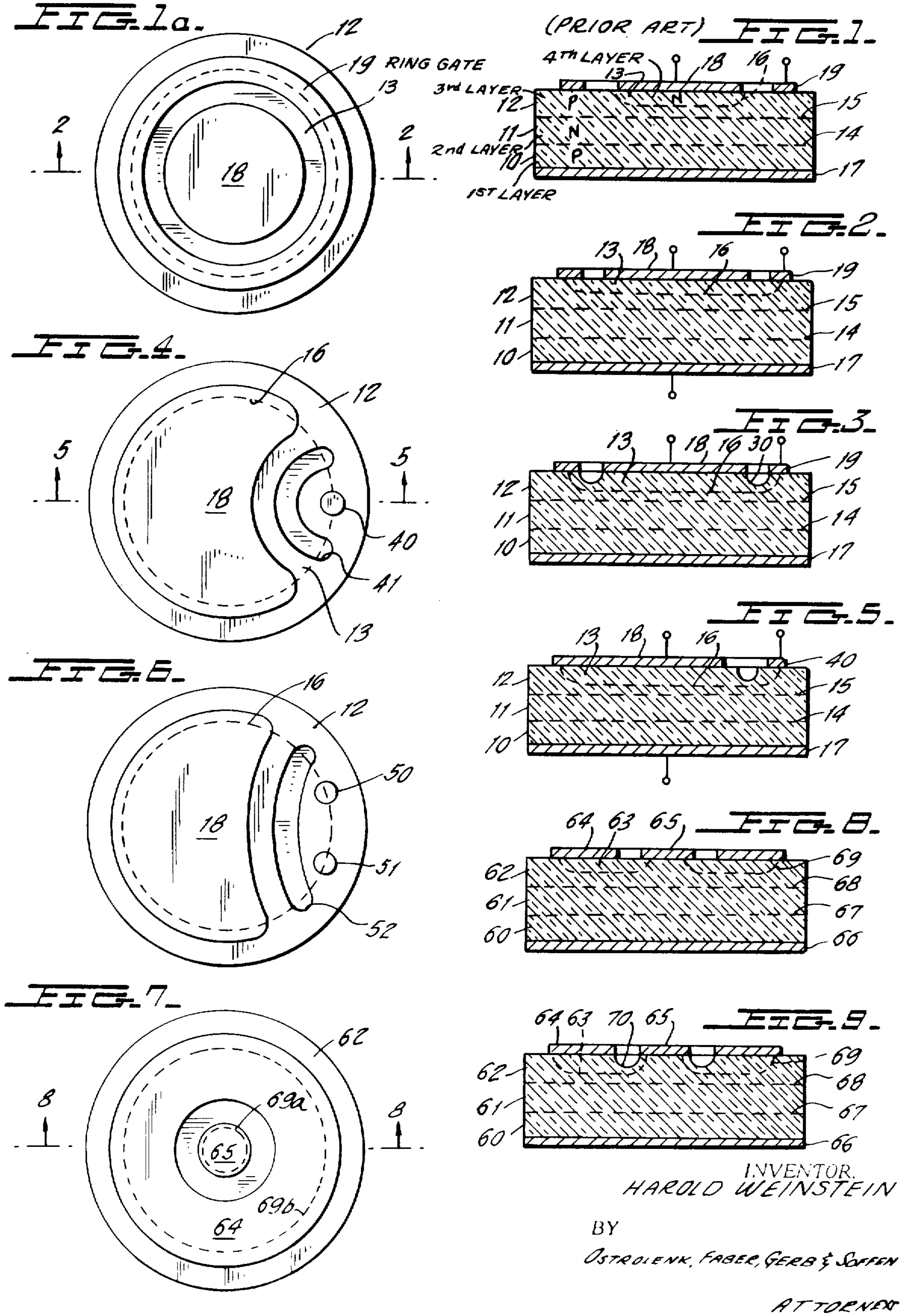

Referring first to FIG. 1, there is illustrated a typical prior-art type controlled rectifier using a ring gate configuration and a shorted emitter. More particularly, the device of FIG. 1 is a four-layer device consisting of the labeled PNPN layers 10, 11, 12 and 13 which may be formed in a monocrystalline silicon wafer in a known manner and which define junctions 14, 15 and 16. Layers 10, 11, 12 and 13 are labeled in FIG. 1 as first, second, third and fourth layers. The upper N layer 13 is hereinafter referred to as the cathode layer, while layer 12 is referred to as the emitter layer, these terms being used in the conventional manner and referring to the well-known two-transistor equivalent circuit used to describe the operation of controlled rectifiers.

An anode electrode 17 is attached across the bottom of layer 10, while a cathode electrode 18 is connected atop N-type cathode layer 13. A ring gate electrode 19 is then attached to the exposed portions of the emitter layer 12 and suitable terminal leads are connected to the electrodes 17, 18 and 19 in an ordinary manner. Cathode electrode 18 may overlap the edge of junction 16 and contact regions of emitter layer 12 to improve the ability of the device to withstand high rate-of-rise-of-forward-voltage between electrodes 17 and 18 without unintentionally firing the device and in the absence of a signal connected to gate electrode 19.

In the device of FIG. 1, assuming that a positive potential is connected to electrode 17 and a negative potential to electrode 18 (the device being forward-biased), there will be a relatively high concentration of electrons around the periphery or rim of junction 16 due to the negative charge on electrode 18. Therefore, when a gate signal is connected to gate electrode 19 for firing the device, initial current plasmas will tend to concentrate along this peripheral rim since the available carriers exist therein. Therefore, the initial current flow through the device will be along this relatively small area rim region so that it is necessary to reduce the rate-of-rise-of-current until the initial conduction plasmas have spread out over the full available area of junction 16.

In accordance with the present invention and as shown in FIGS. 1*a* and 2, the initial and relatively high negative charge existing around the rim of the first junction 16 is decreased.

Referring to FIGS. 1*a* and 2, elements identical to those of FIG. 1 have been given similar identifying numerals. It will be seen in FIG. 2 that the ring gate electrode 19 is now disposed to overlap the periphery of junction 16 to directly connect regions of emitter 12 and cathode layer 13.

That is, ring gate electrode 19 has a first portion which contacts the layer 12 outside of the surface boundary of the junction 16, and a second portion which contacts the layer 13 inside the surface boundary of junction 16.

Accordingly, just prior to firing the device, the carrier distribution around the periphery of junction 16 will be more positive due to the application of a positive signal to gate electrode 19. Therefore, initial conduction plasmas will not be as likely to start at these regions, but rather will start at more interior regions within layer 13 and disposed under the bulk of electrode 18 when the device initially fires. Thus, heat created due to the initial conduction plasmas can be more easily removed from the device, and the initial conduction plasmas will be distributed over a wider area since they are forced away from the localized rim portions of junction 16. Therefore, it becomes possible to permit the rate-of-rise-of-current upon firing the device to be higher than in the case of FIG. 1 where the localized heat due to excessive rate-of-rise-of-current could not be as efficiently removed and is concentrated into smaller areas.

FIG. 3 illustrates an embodiment of the invention using the novel shorting gate structure for gate electrode 19 disposed as in FIG. 2 where, however, a groove 30 is formed in the device and is interposed between the adjacent peripheries of cathode electrode 18 and ring gate electrode 19. When the gate electrode 19 is arranged as shown in FIGS. 2 and 3, the effective diode or rectifying junction normally formed between the gate electrode and cathode electrode (junction 16) is short-circuited. Where it is desired to retain this rectifying junction, the groove 30 will cause a relatively high-resistance path between the cathode electrode 18 and the outer peripheral regions of layer 30 which are connected to gate electrode 19. The resistance of this path is controlled by the depth of groove 30 and can be any desired value depending upon the choice of the circuit designer.

The portion of gate electrode 19 connected to emitter 12, however, is connected to cathode electrode 18 through the junction 16 so that for all practical purposes, the use of groove 30 causes the device to retain the rectifying properties in the connection between gate electrode 19 and cathode electrode 18 which, however, is connected in parallel with a high resistance formed by groove 30. Note that the presence of groove 30 will not degrade the electrostatic control of the charge concentration on the periphery of junction 16 due to the negative charge on cathode electrode 18 before firing of the device. Thus, the desired increased rate-of-rise-of-current ability for the device is retained even though groove 30 restores the rectifying junction between gate and cathode where this is desired.

The foregoing describes the novel invention in connection with a controlled rectifier having a ring gate, and with a PNPN sequence of layers. Clearly, the invention would equally apply to a device having an NPNP sequence with the gate fired by a negative signal.

FIGS. 4 and 5 illustrate the manner in which the invention may apply to a controlled rectifier having a single and small gate electrode. Again, elements similar to those of the preceding figures are given identical numerals.

In FIG. 4, the cathode electrode 18 is illustrated to be of the shorted emitter variety for control of rate-of-rise-of-forward-voltage. Thus, cathode electrode 18 slightly overlaps the periphery of junction 16. The gate electrode 40 of FIGS. 4 and 5 is shown as a small area gate of a standard type which, however, is not disposed fully on the emitter region 12 but, in accordance with the invention, overlaps across the periphery of junction 16 and between emitter region 12 and the cathode layer 13. Thus, the negative charge that would previously have appeared adjacent layer 16 before firing due to a negative potential connected to electrode 18 will be decreased by the positive potential connected to gate electrode 40. This will then tend to limit the initial conduction plasma adjacent gate 40 when the device is fired and will cause the initial conduction plasmas to be more spread out and to be located closer to the heat sink defined by electrode 18.

Again, if the rectifying characteristic of the gate is to be retained, a localized groove 41 is formed in layer 13 and interposed between gate electrode 40 and cathode electrode 18. As described in the case of FIG. 3, the groove 41 will cause a high-resistance connection between the portion of the gate electrode 40 disposed on the layer 13 of the cathode electrode 18.

FIG. 6 is similar to FIG. 4, but illustrates the use of two spaced gate electrodes 50 and 51, each extending across the periphery of the junction 16 and with a suitable groove 52 interposed between gate electrodes 50 and 51 and the cathode electrode 18.

FIGS. 7 and 8 illustrate the manner in which the invention can be applied to a center gate-type configuration for the controlled rectifier in FIGS. 7 and 8. The rectifier is comprised of N-type layer 60, P-type layer 61, N-type layer 62 and an annular P-type layer 63. The annular layer 63 is the cathode layer and receives a ring-shaped cathode electrode 64, while the layer 62 is the emitter layer and receives the gate electrode 65. A suitable anode electrode 66 is connected across the bottom of layer 60. The various layers then define junctions 67, 68 and a ring-shaped junction 69 which terminates on the surface of the device and on closed lines 69*a* and 69*b*, shown in FIG. 7. The shorted emitter effect desired for controlling rate-of-rise-of-forward-voltage is obtained in the usual manner by having the outer periphery of cathode electrode 64 overlap from layer 63 to layer 62 and across the edge 69*b* of junction 69.

In accordance with the invention, the gate electrode 65 is also caused to overlap from the emitter region 62 and on to the gate region 63, as shown. The normally high concentration of charge carriers adjacent peripheral portion 69a of junction 69 would cause initial conduction plasmas upon firing of the device to concentrate in the small localized region around the peripheral portion 69a. However, by causing the gate electrode 65 to come into contact with these regions, the positive charge of the gate 65 will decrease the negative charge concentration, thereby to cause initial conduction plasmas to be better distributed, and to improve the ability of the device to support increased rate-of-rise-of-current. Again, in the device of FIG. 8, the rectifying junction between the gate 65 and cathode 64 has been short-circuited.

As illustrated in FIG. 9, however, an annular groove 70 can be placed around gate electrode 65 to form the high-resistance path in region 63 between the gate electrode 65 and cathode electrode 64. Thus, the rectifying junction between gate 65 and cathode 64 is restored with a high-resistance shunt.

The devices described in the foregoing can be manufactured using standard manufacturing techniques well known to those skilled in the art. In the embodiment of FIG. 3 and for a wafer having a total thickness of 15 mils for the junction 16 having a depth of 1 mil, the layer 13 can be etched to a depth of about 0.5 mil to obtain the desired isolation between the gate 19 and cathode 18. Moreover, in the manufacture of the device of FIG. 3, the gate electrode 19 and cathode electrode 18 can be formed as a single layer of conductive material which are later separated into their two electrodes by etching of the groove 30 directly through the original unitary conductive layer and into the layer 13. The width of the groove 30 may be about 20 mils. A similar groove configuration can be used for the remaining embodiments of FIGS. 4 and 9. Note that in FIG. 9 a similar manufacturing process can be used as that described in FIG. 3 where electrodes 64 and 65 can be initially formed as a common electrode which is later separated into two separate electrodes by the process forming the groove 70.

The embodiments of the invention in which an exclusive privilege or property is claimed are defined as follows:

1. A controlled rectifier comprising a wafer of semiconductor material having first, second, third and fourth layers of alternating conductivity types sequentially disposed one atop the other throughout the thickness of said wafer, and continuous along the length thereof to form first, second and third vertically disposed junctions in said wafer along the coincidence surfaces of said layers; an anode electrode connected to the bottom surface of said first layer; a cathode electrode connected to the top surface of said fourth layer; and a gate electrode spaced from said cathode electrode having a first portion connected to said top surface of said fourth layer and a second portion integral with said first portion extending across the junction between said third and fourth layers and connected to the top surface of said third layer for reducing current concentration adjacent said gate electrode to increase the rate-of-rise-of-current upon the firing of said rectifier.

2. The device of claim 1 which includes a groove extending into said fourth layer and interposed between said second portion of said gate electrode and said cathode electrode.

3. The device of claim 1 wherein said cathode electrode extends across said junction between said third and fourth layers and is connected to said third layer.

4. The device as set forth in claim 1 wherein said gate electrode has a ring shape and surrounds said cathode electrode; said gate electrode and cathode electrode being coplanar.

5. The device as set forth in claim 5 which includes an annular groove in said fourth layer radially disposed between said cathode electrode and said ring-shaped gate.

6. The device as set forth in claim 1 wherein said cathode electrode has a ring shape and surrounds said gate electrode; said cathode electrode and gate electrode being coplanar.

7. The device as set forth in claim 6 which includes an annular groove in said fourth layer radially disposed between said ring-shaped cathode electrode and said gate.

* * * * *

UNITED STATES PATENT OFFICE
CERTIFICATE OF CORRECTION

Patent No. 3,700,982 Dated October 24, 1972

Inventor(s) Harold Weinstein

It is certified that error appears in the above-identified patent and that said Letters Patent are hereby corrected as shown below:

Column 6, line 33, numeral "5" (second occurrence) should read numeral -- 4 --

Signed and sealed this 1st day of May 1973.

(SEAL)
Attest:

EDWARD M. FLETCHER, JR.
Attesting Officer

ROBERT GOTTSCHALK
Commissioner of Patents